(12) United States Patent
Coldrey

(10) Patent No.: US 10,306,653 B2
(45) Date of Patent: May 28, 2019

(54) PROTECTION SYSTEM FOR WIRELESS NLOS BACKHAUL

(71) Applicant: TELEFONAKTIEBOLAGET L M ERICSSON (PUBL), Stockholm (SE)

(72) Inventor: Mikael Coldrey, Landvetter (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 410 days.

(21) Appl. No.: 14/764,542

(22) PCT Filed: Jan. 30, 2013

(86) PCT No.: PCT/EP2013/051792
§ 371 (c)(1),
(2) Date: Jul. 29, 2015

(87) PCT Pub. No.: WO2014/117832
PCT Pub. Date: Aug. 7, 2014

(65) Prior Publication Data
US 2015/0365959 A1    Dec. 17, 2015

(51) Int. Cl.
*H04W 72/08* (2009.01)
*H04W 24/04* (2009.01)
(Continued)

(52) U.S. Cl.
CPC ......... *H04W 72/085* (2013.01); *H04W 24/04* (2013.01); *H04W 24/10* (2013.01);
(Continued)

(58) Field of Classification Search
CPC .................................................. H04W 24/08
See application file for complete search history.

(56) References Cited

U.S. PATENT DOCUMENTS

| 6,795,414 B1* | 9/2004 | Sakamoto | H04B 7/022 370/331 |
| 7,697,450 B2* | 4/2010 | D'Amico | H04B 7/155 370/252 |

(Continued)

FOREIGN PATENT DOCUMENTS

| CN | 102687444 A | 9/2012 |
| EP | 2424327 A1 | 2/2012 |

(Continued)

OTHER PUBLICATIONS

Office Action dated Aug. 3, 2016, issued in Mexican Patent Application No. MX/a/2015/006734, 3 pages.

(Continued)

*Primary Examiner* — Andrew Lai
*Assistant Examiner* — Andrew C Lee
(74) *Attorney, Agent, or Firm* — Rothwell, Figg, Ernst & Manbeck, P.C.

(57) ABSTRACT

A protection system, configured for switching between backhaul technologies for upholding a communication in a wireless backhaul network, to a main node, to a dependent node, and a method for switching between backhaul technologies for upholding a communication. The protection system comprises a main node and a dependent node, wherein the main node and the dependent node are configured for communicating with each other via a backhaul channel, and a switching unit configured for selecting a backhaul technology for a communication via the backhaul channel, wherein at least one of the main node and the dependent node are further configured for measuring a quality parameter of the backhaul channel, wherein the switching unit is further configured for switching the backhaul technology selected for the communication via the (Continued)

backhaul channel to a predefined backhaul technology dependent on the quality parameter measured.

17 Claims, 3 Drawing Sheets

(51) Int. Cl.
*H04W 24/10* (2009.01)
*H04W 72/10* (2009.01)
*H04B 7/155* (2006.01)
*H04W 72/04* (2009.01)

(52) U.S. Cl.
CPC ......... *H04W 72/10* (2013.01); *H04B 7/15542* (2013.01); *H04W 72/0406* (2013.01)

(56) References Cited

U.S. PATENT DOCUMENTS

| | | | | |
|---|---|---|---|---|
| 8,254,949 B2* | 8/2012 | Tafreshi | ................ | H04W 36/18 455/453 |
| 8,355,722 B1* | 1/2013 | Tailor | ................ | H04W 28/16 370/331 |
| 8,385,305 B1* | 2/2013 | Negus | ................ | H04J 1/00 370/338 |
| 8,724,472 B2* | 5/2014 | Huang | ................ | H04B 7/15528 370/236 |
| 8,737,506 B1* | 5/2014 | Shetty | ................ | H04B 7/0689 375/259 |
| 8,804,600 B2* | 8/2014 | Suda | ................ | H04B 7/155 370/315 |
| 8,908,609 B1* | 12/2014 | Naden | ................ | H04B 7/15535 370/329 |
| 8,989,033 B2 | 3/2015 | Song et al. | | |
| 9,066,242 B2* | 6/2015 | Kazmi | | |
| 2007/0155388 A1* | 7/2007 | Petrovic | ................ | H04W 36/30 455/442 |
| 2008/0107091 A1* | 5/2008 | Ramachandran | .... | H04B 7/2606 370/338 |
| 2008/0268844 A1* | 10/2008 | Ma | ................ | H04W 36/0033 455/436 |
| 2009/0190569 A1* | 7/2009 | Hacena | ................ | H04B 7/2684 370/350 |
| 2009/0268807 A1* | 10/2009 | Krishnaswamy | ...... | H04H 20/08 375/240.01 |
| 2011/0080864 A1* | 4/2011 | Cai | ................ | H04W 36/30 370/315 |
| 2012/0027112 A1* | 2/2012 | Jiang | ................ | H04B 7/061 375/267 |
| 2012/0028627 A1* | 2/2012 | Hunzinger | ........ | H04W 36/0083 455/422.1 |
| 2012/0046028 A1* | 2/2012 | Damnjanovic | ........ | H04W 24/02 455/423 |
| 2012/0063417 A1* | 3/2012 | Redana | ................ | H04W 36/22 370/331 |
| 2012/0113884 A1* | 5/2012 | Park | ................ | H04L 1/0003 370/312 |
| 2012/0179810 A1 | 7/2012 | Contreras Delpiano et al. | | |
| 2012/0243430 A1* | 9/2012 | Song | ................ | H04L 1/0015 370/252 |
| 2012/0300654 A1* | 11/2012 | Gan | ................ | H04B 7/155 370/252 |
| 2012/0315916 A1* | 12/2012 | Van Phan | ............ | H04W 36/08 455/442 |
| 2013/0084868 A1* | 4/2013 | Song | ................ | H04W 36/0055 455/436 |
| 2013/0102313 A1* | 4/2013 | Tinnakornsrisuphap | .................... | H04W 36/22 455/436 |
| 2013/0163440 A1* | 6/2013 | Issakov | ................ | G01S 5/0221 370/246 |
| 2013/0183895 A1* | 7/2013 | Gore | ................ | H04B 7/0404 455/7 |
| 2013/0246575 A1* | 9/2013 | Giaretta | ................ | H04L 41/00 709/218 |
| 2014/0160939 A1* | 6/2014 | Arad | ................ | H04L 47/122 370/237 |
| 2014/0321282 A1* | 10/2014 | Pragada | ............ | H04W 36/0072 370/235 |

FOREIGN PATENT DOCUMENTS

| | | |
|---|---|---|
| WO | 2009014764 A1 | 1/2009 |
| WO | 2012097102 A1 | 7/2012 |
| WO | 2012105881 A1 | 8/2012 |

OTHER PUBLICATIONS

Coldrey et al. "Small-Cell Wireless Backhauling, A Non-Line-of-Sight Approach for Point-to-Point Microwave Links" IEEE, 2012, 5 pages.
Ericsson "Ericsson Review", 2011, 40 pages.
European Communication dated Mar. 15, 2018, issued in European Patent Application No. 13702215.8, 9 pages.
First Chinese Office Action dated Jan. 10, 2018, issued in Chinese Patent Application No. 201380071747.X, 16 pages.
Second Chinese Office Action dated Sep. 11, 2018, issued in Chinese Patent Application No. 201380071747.X, 14 pages.
Examination Report, in corresponding Philippine Application No. 1/2015/501413, dated Jan. 9, 2019, 4 pages.
Third Chinese Office Action dated Jan. 31, 2019, issued in Chinese Patent Application No. 201380071747.X, 13 pages.

* cited by examiner

PROTECTION SYSTEM FOR WIRELESS NLOS BACKHAUL

CROSS REFERENCE TO RELATED APPLICATION(S)

This application is a 35 U.S.C. § 371 National Phase Entry Application from PCT/EP2013/051792, filed Jan. 30, 2013, designating the United States, the disclosure of which is incorporated herein in its entirety by reference.

TECHNICAL FIELD

The invention relates to a protection system configured for switching between backhaul technologies for upholding a communication in a wireless backhaul network.

BACKGROUND

It is likely that a wireless backhaul system for small cells operates in a non-line-of-sight (NLOS) environment. Conventionally, most wireless backhaul systems are designed for microwave communications in a line-of-sight (LOS) environment which guarantees a high availability of a desired data rate over a communication link or link, respectively. LOS operation also guarantees an extremely low outage probability, i.e. the link is in principle never in outage which is important when designing wireless backhaul systems that transport user data and control data traffic between radio base stations (RBSs).

It is desirable that a wireless backhaul system operating in NLOS should also guarantee a high availability and thus a very low outage probability. It is however difficult to achieve this when using microwave frequencies, for instance microwave frequencies larger than 10 GHz, for backhauling in NLOS. Nowadays a general consensus within the wireless industry is that the capacity offered in existing cellular radio access networks based on macro cells cannot fulfil the requirements for future mobile broadband services unless a capacity boost is achieved at specific locations, such as at hotspots, cell edges and indoor locations. One approach to increase the capacity at these locations is to deploy low power radio base stations, such as pico RBSs, covering smaller cells within the macro cell coverage area in a heterogeneous network. Assuming that each macro cell is supported by a few small cells, the number of cells in the network and thus the required number of mobile backhaul (MBH) links will increase dramatically. Due to its small coverage area it will be important that the small cell pico RBS is arranged in a correct location, not limited by the availability of a broadband connection for MBH. Further, the pico RBS will in many cases be placed or arranged below rooftop level of a building, preventing a clear LOS between the pico RBS and an aggregation node that is co-located with a macro RBS above rooftop. Typically, the macro RBS is arranged on a rooftop of a building. The macro RBS is characterized by a large coverage area, by high power and directional antennas. The pico RBS is typically arranged up to 6 meters above street level, for instance on a building wall, dependent on the desired application and environment. In an NLOS environment communication via a backhaul channel is primarily based on diffraction and/or reflection. Traditional MBH technologies, such as copper, optical fiber or LOS microwave links, may not always fit to such a heterogeneous backhaul scenario and thus they need to be complemented by low cost wireless NLOS MBH links. NLOS propagation has traditionally been proposed only for carrier frequencies below 6 GHz. However, wideband spectrum on these frequencies is a scarce resource and if made available it becomes attractive to utilize this spectrum for mobile broadband services in a radio access network (RAN).

Traditional fixed service LOS microwave point-to-point (PtP) links operate in licensed frequency bands between 6 GHz and 42 GHz on channel bandwidths ranging from 3.5 MHz up to 112 MHz. Due to the nature of the traffic carried by the MBH, traditional PtP LOS links are required to have an extremely high availability. However, if a small cell is within the coverage area of a macro cell in a heterogeneous deployment, an extremely high availability requirement on the small cell backhaul can be debated. The requirement for a small cell MBH is becoming an increasingly important topic that is discussed within the industry and it is driven by the evolution towards flexible and cost effective heterogeneous deployments.

Over the last few years there has been an increased interest for the higher frequency bands for MBH applications, in particular for the 60 GHz band comprising a 9 GHz of bandwidth between 57 to 66 GHz and for the 70/80 GHz band comprising a total of 10 GHz bandwidth between 71 to 86 GHz. Compared to the 56 and 112 MHz channels available for traditional microwave links, the bandwidths offered in these bands are large which makes them attractive. Parts of the 60 GHz band is license free spectrum which means that anyone can deploy systems within that band as long as the equipment complies with predefined regulations. Nevertheless, this frequency is particularly interesting for small cell MBH applications since the excess oxygen loss at this band may attenuate interference from neighbouring links enabling efficient frequency reuse.

In cellular communications a mobile user is associated or connected to a cell. The choice of a cell is usually based on being connected to the, in some sense, best cell for the particular user. Due to mobility of a user, the user might experience another cell as an alternative connection. If needed, the system may handover the user to another cell. Conventionally, handovers are based on measurements on the access links from different cells or base stations.

A microwave-based wireless backhaul system operating in NLOS will have problems with guaranteeing a high availability and low outage probability due to a number of issues related to microwave propagation in urban NLOS. Some typical disadvantages and problems are described in the following: Weather effects, such as rain and snow, will change the diffraction properties; non-existing penetration of obstacles since high-frequency radio waves rely mostly on reflections and diffractions; trees and other objects may move in the wind; temporary obstacles, for instance tall vehicles passing close to the small cell RBS mounted at or just above street level; long-term changes in the urban topology, for instance new buildings, commercial billboard signs and so on; unexpected multipath propagation due to strong reflections; and high gain antennas, i.e. pencil beam antennas, that become misaligned due to weather effects or vandalism.

There is a need to provide high gain antennas for compensating for the high path loss associated with high frequencies in an NLOS environment. If the backhaul to/from a particular access point fails or is lost, the users connected to that particular access point could ideally do a handover to another access point with a functioning backhaul. However, a failed backhaul connection means that the network has lost all of its communication to/from that access point which makes it impossible for the access point to request such a handover of its users.

Instead, this handover has to be requested by the users themselves which might mean that many users have to quickly do simultaneous handover requests which increase the likelihood of dropped connections. It could be that the users might have a poor, a very poor or even a non-existing connection to an alternative access point. For instance, the users might be indoors and connected to an indoor access point that receives its backhaul connection via an outdoor or close to an outdoor antenna solution.

SUMMARY

It is the object of the invention to provide a possibility for increasing availability of a wireless backhaul network in connection with decreasing the outage probability of a backhaul link and for providing a more robust backhauling.

This object is achieved by the subject matter of the independent claims. Preferred embodiments are defined in the sub claims.

According to a first aspect of the invention, this object is achieved by a protection system, configured for switching between backhaul technologies for upholding a communication in a wireless backhaul network, comprising a main node and a dependent node, wherein the main node and the dependent node are configured for communicating with each other via a backhaul channel, and a switching unit configured for selecting a backhaul technology for a communication via the backhaul channel, wherein at least one of the main node and the dependent node are further configured for measuring a quality parameter of the backhaul channel, wherein the switching unit is further configured for switching the backhaul technology selected for the communication via the backhaul channel to a predefined backhaul technology dependent on the quality parameter measured.

The main node preferably corresponds to a macro radio base station or to a macro cell, whereas the dependent node preferably corresponds to a pico radio base station or to a pico cell, respectively. The term "switching between backhaul technologies" does not only mean that it is either switched to one or to another backhaul technology but also that there could be a mix between at least two backhaul technologies. This allows to uphold a communication or being connected using a plurality of backhaul technologies at the same time, preferably at least during a handover process. The wireless backhaul network preferably corresponds to a wireless non-line-of-sight backhaul network. The term "communication" in its general meaning refers to two nodes, i.e. to a first node and to a second node, communicating with each other, for instance via a channel, wherein the first node preferably transfers information or data to the second node. The first node preferably comprises a radio transmitter and the second node preferably comprises a radio receiver. The first node and the second node are preferably arranged in a radio communication system.

It is thus an idea of the invention to allow a wireless backhaul connection to fall back to a macro RBS access as a backup solution in the event of an outage, preferably by using microwave frequencies. Backhauling using access systems can also be called "in-band relaying" or "out-band relaying" which are defined in 3GPP. Preferably, the wirelessly backhauled small cell RBS, in other words the pico RBS, is preferably arranged within the coverage area of the macro cell or the macro RBS, respectively, which operates on regular international mobile telecommunication standard bands (IMT bands). IMT represents a technology standard underlying 3G mobile telecommunications, whereas 3G is merely one of many examples of IMT technologies. In this way, the overall wireless backhaul connection becomes more robust due to system diversity and/or due to technology diversity. Typically, in NLOS the more unreliable wireless backhauling using microwave technology may fail due to different reasons and then this can be communicated via IMT technology, for instance using high speed packet access (HSPA) or long-term-evolution (LTE) back to the macro RBS with the invention at hand. Furthermore, control data and prioritizing data traffic can still be communicated via IMT technology. HSPA represents a mobile broadband technology, whereas LTE is a standard for a wireless communication technology. Preferably, a macro RBS prioritizes the scheduling of a small cell RBS backhauling in the event of a poor or a lost microwave connection.

According to a preferred embodiment of the invention, the switching unit is further configured for requesting a status parameter of the backhaul channel, wherein the status parameter comprises a communication status from at least one of the main node and the dependent node. The switching unit is preferably further configured for transmitting the requested status parameter of the backhaul channel to the dependent node and/or to the main node. Preferably, the quality parameter of the backhaul channel comprises a received signal strength (RSL) parameter, a channel quality indicator (CQI) parameter, a latency measure parameter and/or repeated retransmission requests, wherein the quality parameter is configured for indicating performance of the backhaul channel. The predefined backhaul technology preferably comprises a mobile telecommunication technology, such as HSPA and LTE, a microwave technology and/or a wireless local area network technology, such as Wi-Fi.

According to a preferred embodiment of the invention, the protection system comprises a diversity unit configured for receiving the status parameter of the backhaul channel transmitted from the switching unit, the switching unit being arranged at least partly inside the main node and/or being arranged at least partly inside the dependent node, wherein the diversity unit is further configured for controlling and for prioritizing data traffic between the main node and the dependent node dependent on the status parameter received and/or dependent on the quality parameter. The diversity unit is preferably arranged at least partly inside the main node and/or is preferably arranged at least partly inside the dependent node, the diversity unit being further configured for scheduling data traffic towards the dependent node and/or towards the main node dependent on the quality parameter and/or dependent on the status parameter. Preferably, the diversity unit, arranged at least partly inside the dependent node, is further configured for sending a prioritizing request and/or for sending a scheduling request to the main node.

According to a preferred embodiment of the invention, the predefined backhaul technology corresponds to HSPA and/or LTE and is based on a relaying-type of backhaul. With reference to 3GPP terminology, an LTE RBS is called enhanced node base station (eNB). A relay in 3GPP terminology is an eNB that is backhauled to another eNB using LTE technology. Hence, it is switched between a relaying-type of backhaul and a microwave backhaul. The dependent node is preferably arranged in non-line-of-sight to the main node within a predefined coverage area of the main node.

According to a second aspect of the invention, abovementioned object is achieved by a main node, configured for communicating in a protection system according to the first aspect of the invention, wherein the main node is configured for communicating via a backhaul channel and for measuring a quality parameter of the backhaul channel. The main node preferably comprises a switching unit configured for selecting a backhaul technology for a communication via the backhaul channel, wherein the switching unit is further configured for switching the backhaul technology selected for the communication via the backhaul channel to a predefined backhaul technology dependent on the quality parameter of the backhaul channel measured.

According to a third aspect of the invention, above-mentioned object is achieved by a dependent node, configured for communicating in a protection system according to the first aspect of the invention, wherein the dependent node is configured for communicating via a backhaul channel and for measuring a quality parameter of the backhaul channel. The dependent node preferably comprises a switching unit configured for selecting a backhaul technology for a communication via the backhaul channel, wherein the switching unit is further configured for switching the backhaul technology selected for the communication via the backhaul channel to a predefined backhaul technology dependent on the quality parameter of the backhaul channel measured.

According to a fourth aspect of the invention, above-mentioned object is achieved by a method for switching between backhaul technologies for upholding a communication, comprising the steps: a) selecting a backhaul technology used for a communication via a backhaul channel, b) measuring a quality parameter of the backhaul channel, and c) switching the backhaul technology selected for the communication via the backhaul channel to a predefined backhaul technology dependent on the quality parameter measured in the previous step.

According to a preferred embodiment of the invention, the method comprises the step of controlling data traffic and of prioritizing data traffic dependent on the quality parameter measured. Preferably, the method comprises the step of sending a prioritizing request and/or of sending a scheduling request via the backhaul channel.

Hence, it is an idea of the invention that the IMT technology based backup ensures high availability of a data connection between a macro cell and a small cell RBS such that at least control and prioritized data can be communicated to/from the network. Furthermore, the backhaul network is more robust compared to a solution where the users are connected to a small cell RBS and do a user handover to another access point in the event of a backhaul outage. Thus, it is easier to do a single and network controlled "backhaul handover" between two already established technologies which are prepared for such an event compared, for instance, to a case of letting multiple users do simultaneous handover to another access point. With the invention at hand the users stay connected to the small cell RBS. This is advantageously ensured in case of a poor, a very poor or even in case of a non-existing connection to an alternative access point. For instance, the users might be indoors and connected to an indoor access point that receives its backhaul connection via an outdoor or close to outdoor antenna solution.

Advantageously, it is ensured that it is always possible to check the status and that it is possible to communicate control signalling to/from the small cell even in the event of a microwave outage such that the network triggers appropriate actions to resolve the problem. This results in a higher availability irrespective of, for instance, weather effects but also serves as a protection system or a diversity system for failures, such as hardware failures.

BRIEF DESCRIPTION OF THE DRAWINGS

Further objects and advantages of the present invention will become apparent from the following description of the preferred embodiments that are given by way of example with reference to the accompanying drawings. In the figures.

DETAILED DESCRIPTION

Figure 1:
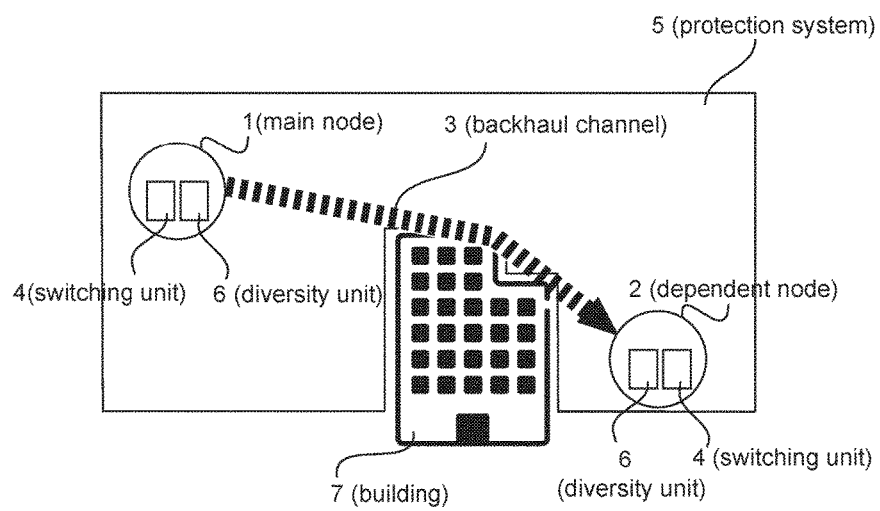
FIG. 1 illustrates a protection system, a main node and a dependent node according to a first preferred embodiment of the invention.

FIG. 1 shows a protection system 5 that is configured for switching between different backhaul technologies. A main node 1 is shown that comprises a switching unit 4 and a diversity unit 6. Furthermore, a dependent node 2 is shown that also comprises a switching unit 4 and a diversity unit 6. In this first preferred embodiment, the main node 1 and the dependent node 2 correspond to a macro RBS and to a pico RBS, respectively. Communication between the macro RBS 1 and the pico RBS 2 takes place via a backhaul channel 3. Since the pico RBS 2 is in NLOS to the macro RBS 1, the communication is based on reflections and diffractions taken place in the urban NLOS environment. In this first preferred embodiment, the urban NLOS environment is characterized by a building 7. The switching unit 4 of the pico RBS 2 selects a backhaul technology that is a microwave technology which is used for communication via the backhaul channel 3. Further, the macro RBS 1 measures a quality parameter of the backhaul channel 3 and afterwards directs the result of this measurement, i.e. the quality parameter measured, to the switching unit 4 which is arranged inside the macro RBS 1 in this first preferred embodiment. In this first preferred embodiment, the received signal level (RSL) is below a certain predefined value and thus the backhaul technology is switched to a different backhaul technology which is a mobile telecommunication technology, such as LTE.

In this first preferred embodiment, the switching unit 4 requests a status parameter of the backhaul channel 3, wherein the status parameter comprises a communication status from the macro RBS 1 and from the pico RBS 2. The switching unit 4 transmits the status parameter of the backhaul channel 3 requested to the pico RBS 2 and to the macro RBS 1. According to other preferred embodiments of the invention, a node or RBS measures its own status and initiates the switching without any status reporting being done via the backhaul. In other words, if a node itself detects a backhaul problem then the node initiates a switch which is preferably communicated to the other node.

Figure 2:
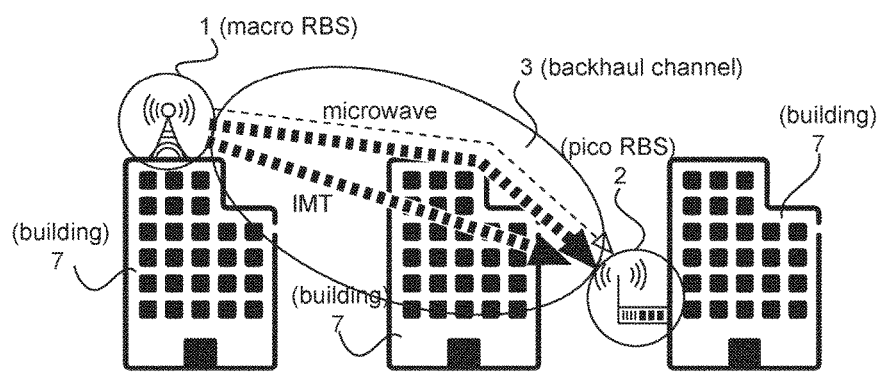
FIG. 2 illustrates a NLOS backhaul solution where microwave is used as the primary backhaul technology and IMT technology for backup according to a second preferred embodiment of the invention.

FIG. 2 illustrates a NLOS backhaul solution where microwave is used as the primary backhaul technology and IMT technology for backup according to a second preferred embodiment of the invention. The narrow arrow illustrates diffracted microwaves and the wide arrows illustrate diffracted and reflected IMT radio waves. A macro RBS 1 communicates via a backhaul channel 3 with a pico RBS 2. Both the macro RBS 1 and the pico RBS 2 are arranged in an urban environment which is characterized by three buildings 7 in this second preferred embodiment. Microwave frequencies in principle rely on rooftop diffraction to reach the pico RBS 2, whereas the IMT band based technology has better propagation characteristics using multipath propagation with reflections and diffraction around the buildings 7 in NLOS which is illustrated by the wide arrows in this second preferred embodiment.

Figure 3:
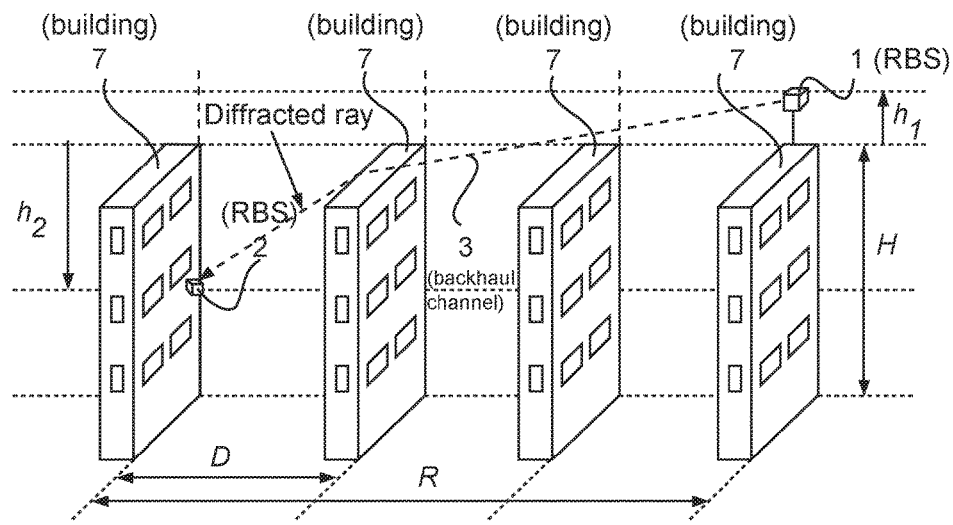
FIG. 3 shows a scenario for a path loss model with diffraction over buildings according to a third preferred embodiment of the invention.
Figure 4:
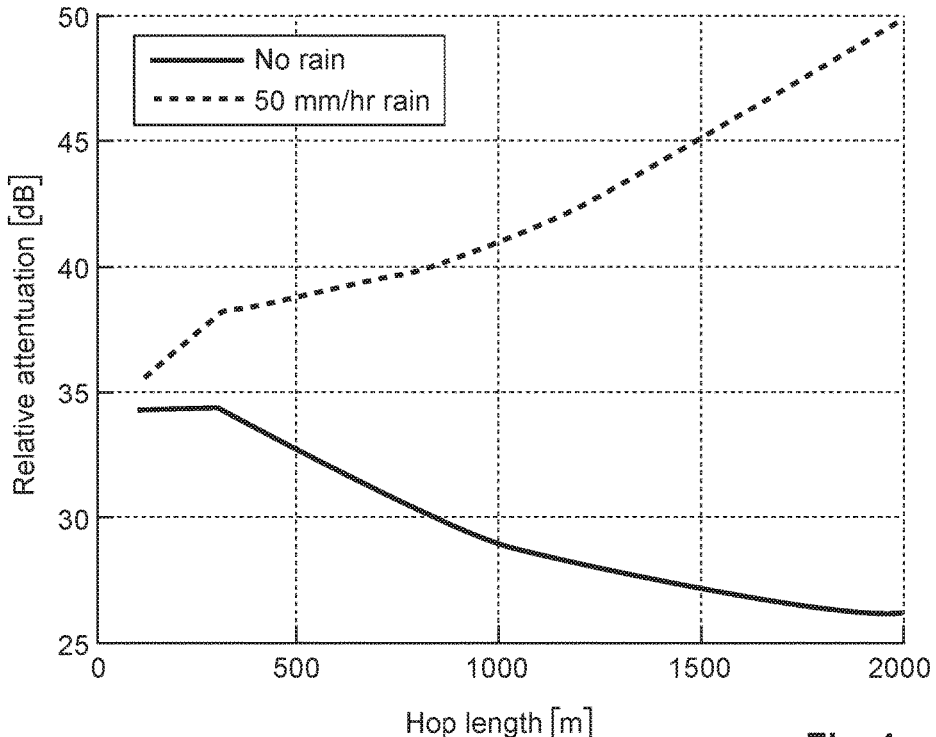
FIG. 4 shows additional path loss experienced at 32 GHz compared to 2.3 GHz according to the third preferred embodiment of the invention.

FIG. 3 shows a path loss model with diffraction over buildings according to a third preferred embodiment of the invention. The parameters used for the model are given by $h_1$ equal to 5 m, $h_2$ equal to 20 m, H equal to 33 m and D equal to 15 m, respectively. FIG. 4 shows the additional path loss a signal experiences at a microwave frequency of 32 GHz compared to an IMT frequency of 2.3 GHz according to the third preferred embodiment of the invention. The relative attenuation in dB is illustrated over the hop length which is given by the distance between the macro RBS 1 and the pico RBS 2 shown in FIG. 3. The solid curve in FIG. 4 represents the relative attenuation without rain and the dashed curve illustrates the situation for 50 mm/hr rain intensity. FIG. 4 illustrates a numerical example where only above rooftop diffraction is considered. Further, a plurality of buildings being arranged in between the corresponding nodes are considered since the hop length varies from 100 m up to 2000 m. At a hop length of 500 m one can see how the 32 GHz channel suffers from additional path losses of 33 dB and 39 dB for without rain and with rain, respectively. It is noticeable how the curves with rain and without rain behave differently with increasing hop length. While the additional path loss decreases with increasing distance when there is no rain, the additional path loss increases with increasing distance in 50 mm/hr rain intensity. This is primarily due to the diffraction losses which are higher at 2.3 GHz than at 32 GHz since there are more obstacles, such as buildings, within the first Fresnel zone at 2.3 GHz. However, rain attenuation, which amounts to approximately 12 dB/km at 32 GHz, dominates the higher diffraction loss at 2.3 GHz which makes the additional path loss increasing with increasing hop length in rain. Hence, FIG. 4 illustrates clearly the challenge when using microwave frequencies compared to IMT bands in NLOS. The extra path loss is at least 33 dB or more for distances up to 500 m, which will have an obvious effect on attainable availabilities and corresponding fading margins.

Figure 5:
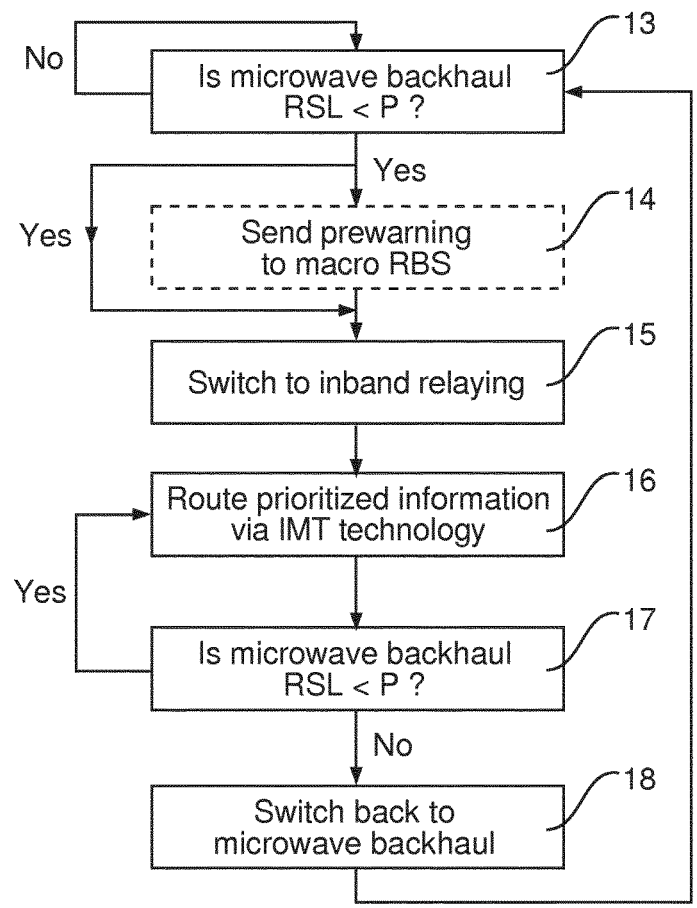
FIG. 5 illustrates a method for switched backhaul diversity according to a fourth preferred embodiment of the invention.

FIG. 5 illustrates a method for switched backhaul diversity according to a fourth preferred embodiment of the invention. The received signal strength (RSL) is a measure of the quality of the channel. In a first step 13, it is checked whether RSL is large and thus if the channel quality is good but if RSL is small then the channel quality is poor. The value of the design parameter P is a measure for deciding when to switch backhaul technology. The prioritized backhaul information is re-routed via IMT technology back to the network, for instance using 3GPP LTE radio access back to a 3GPP eNB in case of a poor microwave backhaul. The microwave backhaul can be in outage or close to outage. If the RSL is large the channel quality is good but if the RSL is small than the channel quality is poor. Optionally, a prewarning can be sent 14 to the macro RBS in case the RSL is small. In this case it is always switched 15 to inband relaying and prioritized information is routed 16 via IMT technology. This continues 17 while the microwave backhaul is still poor otherwise it is switched back 18 again to the microwave backhaul. The decision is based upon the design parameter P. Preferably, P is larger than the minimum RSL required for the backhaul to work to avoid abrupt events. In case of a backhaul outage or whenever it is desired to communicate between a pico RBS and a macro RBS, the macro RBS schedules the pico RBS in a similar way as it schedules users connected to the macro RBS but in a prioritized way, which is realized, for instance, by an inband relay according to 3GPP terminology.

According to another preferred embodiment of the invention, a microwave-based connection in NLOS provides a rate $R_1$ that is available $T_1$% of the time and further a corresponding IMT based connection provides a rate $R_2$ that is available $T_2$% of the time. For simplicity also fixed rates are assumed and that $R_1=R_2=R$ which makes sense if the microwave connection has wider bandwidth but worse path loss in NLOS compared to the IMT connection.

Finally, it is assumed that the two links show independent outage probabilities. Availability is defined as one minus outage probability. The network is in outage if and only if both the microwave based backhaul and the IMT based backhaul are both in outage at the same time, which becomes a very low probability event which implies a higher availability of the backhauling compared to other preferred embodiment covering a scenario when only a single backhaul technology is used. With the assumptions above, the total availability $T_3$ in % of the backhauling in this preferred embodiment becomes $$T_3 = \left(1 - \left(1 - \frac{T_1}{100}\right) \cdot \left(1 - \frac{T_2}{100}\right)\right) \cdot 100\%,$$

and corresponding availabilities can thus be calculated by applying above mentioned formula. Once the channel quality is good enough, a backhaul handover back to the microwave backhaul technology is initiated.

Figure 6:
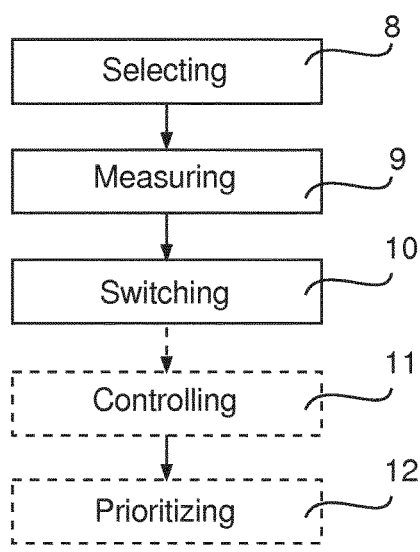
FIG. 6 schematically illustrates the steps of a method for switching between backhaul technologies according to a fifth preferred embodiment of the invention.

FIG. 6 schematically shows the step of a method for switching between backhaul technologies in a wireless backhaul network according to a fifth preferred embodiment of the invention. In a first step, a backhaul technology used for communication via a backhaul channel between a main node and a dependent node is selected 8. In a second step, a quality parameter of the backhaul channel is measured 9. In a final step, the backhaul technology selected is switched 10 to a predefined backhaul technology for communication between the main node and the dependent node dependent on the quality parameter measured in the previous step 9. In further steps, control 11 and prioritizing 12 data traffic between the main node and the dependent node using the predefined backhaul technology is performed.

According to another preferred embodiment of the invention, a step of sending a prioritizing request and/or of sending a scheduling request via the backhaul channel is performed. According to yet other preferred embodiments of the invention, the step of sending a prioritizing request or of sending a scheduling request is not performed via the backhaul channel but, in case it has been switched to an alternative backhaul technology, such as to LTE, LTE prioritizes the backhaul scheduling. For instance, this can be done by a 3GPP in-band relay which comprises reserved resources for the in-band relaying, i.e. the LTE "backhaul" prioritizes backhaul traffic in case backhaul is switched to in-band LTE.

While the invention has been illustrated and described in detail in the drawings and foregoing description, such illustration and description are to be considered illustrative or exemplarily and not restrictive; the invention is not limited to the disclosed embodiments.

Other variations to the disclosed embodiments can be understood and affected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that the combination of these measures cannot be used to advantage. Any reference signs in the claims should not be construed as limiting the scope.

The invention claimed is:

1. A protection system, configured for switching between backhaul technologies for upholding a communication in a wireless backhaul network, comprising:
   a main node and a dependent node, wherein the main node and the dependent node are configured for communicating with each other via a backhaul channel;
   a switching unit configured for selecting a backhaul technology for a communication via the backhaul channel, wherein at least one of the main node and the dependent node are further configured for measuring a quality parameter of the backhaul channel, wherein the switching unit is further configured for switching the backhaul technology selected for the communication via the backhaul channel to a predefined backhaul technology dependent on the quality parameter measured; and
   a diversity unit configured for receiving a status parameter of the backhaul channel transmitted from the switching unit, the switching unit being arranged at least partly inside the main node or being arranged at least partly inside the dependent node, wherein the diversity unit is further configured for controlling and for prioritizing data traffic between the main node and the dependent node dependent on one or more of: (i) the status parameter and (ii) the quality parameter.

2. The protection system according to claim 1, wherein the switching unit is further configured for requesting the status parameter of the backhaul channel, wherein the status parameter comprises a communication status from at least one of the main node and the dependent node.

3. The protection system according to claim 2, wherein the switching unit is further configured for transmitting the requested status parameter of the backhaul channel to one or more of the dependent node and to the main node.

4. The protection system according to claim 1, wherein the quality parameter of the backhaul channel comprises one or more of a received signal strength parameter, a channel quality indicator parameter, a latency measure parameter and repeated retransmission requests, wherein the quality parameter is configured for indicating performance of the backhaul channel.

5. The protection system according to claim 1, wherein the predefined backhaul technology comprises one or more of a mobile telecommunication technology, a microwave technology, and a wireless local area network technology.

6. The protection system according to claim 1, wherein the diversity unit is arranged at least partly inside the main node and/or is arranged at least partly inside the dependent node, the diversity unit being further configured for scheduling data traffic towards the dependent node and/or towards the main node dependent on the quality parameter and/or dependent on the status parameter.

7. The protection system according to claim 6, wherein the diversity unit arranged at least partly inside the dependent node is further configured for sending a prioritizing request and/or for sending a scheduling request to the main node.

8. The protection system according to claim 1, wherein the predefined backhaul technology corresponds to HSPA and/or LTE and is based on a relaying-type of backhaul.

9. The protection system according to claim 1, wherein the dependent node is arranged in non-line-of-sight to the main node within a predefined coverage area of the main node.

10. The protection system of claim 1, wherein the switching the backhaul technology selected for the communication via the backhaul channel comprises switching to a mix of a first predefined backhaul technology and a second predefined backhaul technology, wherein the first predefined backhaul technology is different than the second predefined backhaul technology.

11. The protection system of claim 10, wherein the main node and the dependent node are further configured for communicating with each other using the mix of the first predefined backhaul technology and the second predefined backhaul technology at the same time.

12. The protection system of claim 1, wherein the main node corresponds to a macro cell and the dependent node corresponds to a pico cell.

13. A main node, configured for communicating in a protection system, wherein the main node is configured for communicating via a backhaul channel and for measuring a quality parameter of the backhaul channel, wherein the protection system is configured for switching between backhaul technologies for upholding a communication in a wireless backhaul network, comprising:
   a main node and a dependent node, wherein the main node and the dependent node are configured for communicating with each other via a backhaul channel;
   a switching unit configured for selecting a backhaul technology for a communication via the backhaul channel, wherein at least one of the main node and the dependent node are further configured for measuring a quality parameter of the backhaul channel, wherein the switching unit is further configured for switching the backhaul technology selected for the communication via the backhaul channel to a predefined backhaul technology dependent on the quality parameter measured; and
   a diversity unit configured for receiving a status parameter of the backhaul channel transmitted from the switching unit, the switching unit being arranged at least partly inside the main node or being arranged at least partly inside the dependent node, wherein the diversity unit is further configured for controlling and for prioritizing data traffic between the main node and the dependent node dependent on one or more of: (i) the status parameter and (ii) the quality parameter.

14. The main node according to claim 13, comprising a switching unit configured for selecting a backhaul technology for a communication via the backhaul channel, wherein the switching unit is further configured for switching the backhaul technology selected for the communication via the backhaul channel to a predefined backhaul technology dependent on the quality parameter of the backhaul channel measured.

15. A method for switching between backhaul technologies for upholding a communication, comprising:
- selecting, by a switching unit, a backhaul technology used for a communication via a backhaul channel;
- measuring, by a main node or a dependent node, a quality parameter of the backhaul channel;
- switching, by the switching unit, the backhaul technology selected for the communication via the backhaul channel to a predefined backhaul technology dependent on the measured quality parameter
- receiving, by a diversity unit, a status parameter of the backhaul channel; and
- controlling and prioritizing data traffic, by the diversity unit, over the backhaul channel dependent on one or more of: (i) the status parameter and (ii) the quality parameter.

16. The method according to claim 15, further comprising controlling data traffic and of prioritizing data traffic dependent on the quality parameter measured.

17. The method according to claim 15, further comprising sending a prioritizing request and/or of sending a scheduling request via the backhaul channel.

\* \* \* \* \*

UNITED STATES PATENT AND TRADEMARK OFFICE
CERTIFICATE OF CORRECTION

PATENT NO. : 10,306,653 B2
APPLICATION NO. : 14/764542
DATED : May 28, 2019
INVENTOR(S) : Mikael Coldrey Page 1 of 1

It is certified that error appears in the above-identified patent and that said Letters Patent is hereby corrected as shown below:

In the Claims

In Column 11, Line 16, in Claim 15, delete "parameter" and insert -- parameter; --, therefor.

Signed and Sealed this
Twelfth Day of May, 2020

Andrei Iancu
*Director of the United States Patent and Trademark Office*